United States Patent [19]

Huang

[11] Patent Number: 4,753,738
[45] Date of Patent: Jun. 28, 1988

[54] SLUDGE CONDITIONING PROCESS
[75] Inventor: Shu-Jen Huang, Naperville, Ill.
[73] Assignee: Nalco Chemical Company, Naperville, Ill.
[21] Appl. No.: 83,536
[22] Filed: Aug. 7, 1987
[51] Int. Cl.$^4$ ................................................ C02F 1/56
[52] U.S. Cl. .................... 210/727; 210/734; 210/917; 134/38
[58] Field of Search .............. 134/10, 38; 210/710, 210/712, 727–729, 732–736, 917

[56] References Cited
U.S. PATENT DOCUMENTS

| | | | |
|---|---|---|---|
| 4,002,490 | 1/1977 | Michalski et al. | 134/38 |
| 4,055,495 | 10/1977 | Gabel et al. | 210/728 |
| 4,067,806 | 1/1978 | Mauceri | 210/728 |
| 4,554,026 | 11/1985 | Cosper et al. | 134/38 |
| 4,686,047 | 8/1987 | Arots | 210/736 X |

Primary Examiner—Thomas G. Wyce
Attorney, Agent, or Firm—John G. Premo; Anthony L. Cupoli; Donald G. Epple

[57] ABSTRACT

A method of conditioning sludge formed in paint spray booths, where the detackifier is a melamine-formaldehyde, polyvinyl alcohol and styrene-acrylate paint detackier by adding a water conditioner that includes acrylamide/dimethylaminoethylmethacrylate methylsulfate quat.

2 Claims, No Drawings

SLUDGE CONDITIONING PROCESS

FIELD OF THE INVENTION

The invention is in the field of conditioning sludges for dewatering. More particularly, the invention is a process for conditioning sludges produced from paint spray detackification programs in the automotive industry for the purpose of increasing their solids content.

BACKGROUND

In the automotive industry paint which does not adhere to the automobile must be removed from the paint spray booth. Generally, this overspray is collected in a waste water system where it is detackified. After detackification, the paint solids are separated from the waste water, filtered and dewatered. The filtered solids are then removed to landfill sites for disposal.

A good detackification program should provide a good sludge dewatering capability. Sludge landfill disposal regulations vary from state-to-state, however, a sludge containing high solids and minimum solids is essential for most landfill sites.

Historically, a clay/amine detackifier has been used to detackify the paint and create a floc. Alternatively, clay/polymer detackifiers/flocculants have been utilized.

These paint detackifier/flocculants are present in the water that collects the paint overspray. When the floc has formed, a sludge is produced which must be removed from the waste water. This sludge is used as landfill. To minimize transporation cost and landfill volume, it is highly desirable to dewater the sludge to create as high a solids content as possible.

We have utilized an acrylamide/dimethylamino ethylmethacrylate methylsulfate quat (i.e. Am/D-MAEM MSQ) polymer composition as the waste water conditioner which serves as a dewatering aid. Typically, this dewatering aid has had an RSV between 7 and 10 and is present in concentrations as low as 0.1 ppm to 50 ppm actives.

Generally, this polymer has worked well because it has a high cationic charge being about 31% cationic in nature. This high cationic charge has reacted with the overall negative charge of the clay/amine and/or the clay/polymer flocculants systems utilized in the past.

NEW DEVELOPMENTS

Recently, we have developed an all organic mixture of melamine-formaldehyde, polyvinyl alcohol, and styrene acrylate (i.e. melamine-formaldehyde, PVA, styrene acrylate) flocculants which act as paint detackifiers. These compositions are described in copending application Ser. No. 061,833 filed June 12, 1987 having the title "Paint Detackification" with the inventor, Shu-Jen Huang. This patent application is incorporated herein by reference.

Because of the overall composition of these paint detackifiers it was expected that the compositions create a floc which was substantially positive in character. For that reason, it was believed that the highly positive standard acrylamide/dimethylaminoethylmethacrylate methylsulfate quat dewatering compositions used with the prior clay/amine or clay/polymer detackifiers/flocculants would not work. For this reason, studies were conducted to find a suitable water conditioner for use as a dewatering aid.

SUMMARY OF THE INVENTION

Surprisingly, I have found that the positively charged acrylamide/dimethylaminoethylmethacrylate methylsulfate quat conditioning aid used for the negatively charged clay/amine and clay/polymer flocculant/detackifiers worked better with what was thought to be the positively charged melamine-formaldehyde, styrene-acrylate, and PVA paint detackifier mixtures and the flocs formed therefrom.

A process for dewatering paint booth detackification sludge comprising the steps of detackifying the paint with a melamine-formaldehyde, and PVA and styrene-acrylate detackifier;

Forming a detackified paint floc;

Adding an acrylamide/dimethylaminoethylmethacrylate methylsulfate quat water conditioner to the floc to form a sludge; and Dewatering said sludge.

Generally the water conditioner has an RSV of at least 6 RSV and more preferably of between 7 ∝ 10. RSV is determined using 0.1 grams polymer per 100 milliliters of water at 25° C. Preferably the water conditioner will be at least 20 mole % DMAEM MSQ and most preferably between 28–35 mole %.

Generally a water conditioner dose of 0.1 ppm or more actives will be satisfactory. More preferably the dosage will be 0.3–2 ppm. The dosage is based on total waste water.

DESCRIPTION OF THE PREFERRED EMBODIMENTS

A laboratory comparison of clay/polymer; clay/amine; and melamine/formaldehyde, polyvinyl alcohol, styrene-acrylate detackifiers was made. Each of the systems sludge was dewatered utilizing as a water conditioner acrylamide/dimethylaminoethylmethacrylate methylsulfate quat. The results are provided below:

TABLE I

| Chemical Program | Clay/ Polymer | Clay/Amine | Melamine-Formaldehyde Styrene-Acrylate |
|---|---|---|---|
| Total sludge Production | 80 cu yd/week | 20 cu yd/week | 15 cu yd/week |
| Sludge solids | 20% | 40% | 55% |
| % Sludge Removal | 40% | 80% | 95% |
| % Sludge Settling | 60% | 20% | 5% |
| Pit cleaning frequency | Every 2 months | Every 6 months | Once a year |
| Microbial Control | Heavy | Some | Minimum |
| Foam control | Heavy | Some | Minimum |

For each of the above tests, the chemical detackifier was added to the waste water collection system to form a detackified floc. Subsequent to floc formation, sludge was separated from the waste water. When that sludge was then pumped to filtering machinery, the water conditioner was added. Mixing occurred in the piping on the way to the filtration machinery. The filtration process utilized was a "filter assisted by vacuum" such as provided by the Hoffman Vacu-Matic and the Pecormatics. However, any mechanical process for dewatering can be used.

A series of tests were conducted at an existing automotive paint spray application facility. The following Table II provides a synopsis of the data collected:

TABLE II

| % Solids | % Ash | BTU/lb. of Wet Sludge | BTU/lb of Dry Sludge | Am/DMAEM MSQ Active |
|---|---|---|---|---|
| 32 | 12 | 3,684 | 10,960 | 0.155 ppm–0.31 ppm |
| 20 | 16 | 3,800 | 10,420 | 0.155 ppm–0.31 ppm |
| 40 | 8.9 | 5,385 | 11,460 | 0.155 ppm–0.31 ppm |
| 31.9 | 14.9 | 3,740 | 10,720 | 0.155 ppm–0.31 ppm |
| 36.3 | 8.3 | 4,0155 | 11,430 | 0.155 ppm–0.31 ppm |
| 40.6 | 12.5 | 4,170 | 11,210 | 0.155 ppm–0.31 ppm |
| 53 | 12 | 6,080 | — | 0.775–1.55 pm |

Additional data from another automotive paint spray booth waste water collection system is provided below in Table III:

TABLE III

| % Solids | % Ash | BTU/lb. of Wet Sludge | | Am/DMAEM MSQ 70–100 ppm As Active |
|---|---|---|---|---|
| 51 | 1 | 7,490 | RK-3840 | " |
| 43 | 11 | 8,940 | 2 K Clear | " |
| 36 | 8 | 6,110 | WBE | " |

RD-3840 is a DuPont acrylic malamine-formaldehyde resin used as a Clear Coat.
2K - Clear is a two component isocyanate urethane Clear Coat.
WBE - is a white base enamel coating used in conjunction with either RK-3840 or 2K Clear.

The data generated in Tables II and III utilized the "filter assist by vacuum" method. For each of those Tables, the melamine-formaldehyde, polyvinyl alcohol, styrene-acrylate detackifier mixture was used prior to the addition of the water conditioner.

Laboratory studies were conducted for the water conditioning aid. These studies are presented in Table IV below:

TABLE IV

| | 1A | 1B | 2A | 2B | 3A | 3B |
|---|---|---|---|---|---|---|
| DMAEM-MSQ | 16 ppm | 29 ppm | 51 ppm | 29 ppm | 94 ppm | 53 ppm |
| Paint Sprayed | 5453 ppm | 5776 | 7538 | 7538 | 10624 | 8122 |
| Sludge % Solids | 56.1 | 46 | 62 | 45.5 | 57 | 38 |
| Ratio of Conditioner/ Paint | 0.29% | 0.50% | 0.68% | 0.51% | 0.88% | 0.63% |
| Detackifiers Used | 300 ppm | 861 ppm | 420 ppm | 970 ppm | 445 ppm | 1060 ppm |

A = Clear Coat. The clear coat is an acrylic melamine-formaldehyde resin designated by DuPont as RK3840.
B = Base Coat. The Base Coat is an acrylic/polyester/melamine resin sold by DuPont as a high solids base coat having the DuPont designator 872-AB839.
C = Is a combination of A and B. That is the base Coat has been applied and the Clear Coat has been applied so that both compositions are in the waste water for detackification.

Although the acrylamide/dimethylaminoethylmethacrylate quat is designated as a methylsulfate quat. The salt does not have to be a sulfate salt it could be any other salt reasonably generated, such as for example the chloride, the bromide, and the like. The use of the designator then is intended to be equivalent to all the other salts specified.

The use of the term ppm is defined to mean parts per million on an actives basis.

For all of the data given in the Tables the water conditioner had an RSV of 7–10 and was approximately 31 mole% DMAEM.

THE DETACKIFIER

Generally the ratio of polyvinyl alcohol to melamine formaldehyde to styrene acrylate is preferably within the ratio of 0.7:2.4:1 to 1.32:4.5:1 on a weight ratio based on actives. The initial dosage ideally will be within the range of 25 to 500 ppm. But a maintenance dosage within the range of from 12:1 to 40:1 paint to detackifier on an active weight basis.

Having described my invention, I claim as follows:

1. A method for conditioning waste water to improve the dewaterability of solids contained therein comprising the steps of forming a detackified paint utilizing an all-organic melamine-formaldehyde, polyvinyl alcohol and styrene acrylate detackifier mixture; forming a detackified paint floc; and adding a acrylamide/dimethylaminoethylmethacrylate methylsulfate quat as a dewatering aid for the floc.

2. The method of claim 1 wherein said detackifier is used at a maintenance dose within the weight range of 12:1 to 40:1 paint to detackifier actives; and at least 0.155 ppm dewatering aid is used.

* * * * *